United States Patent [19]

Hashizume et al.

[11] Patent Number: 4,865,265
[45] Date of Patent: Sep. 12, 1989

[54] MAGNETIC TAPE CASSETTE

[75] Inventors: Kenji Hashizume, Nagano; Masaru Ikebe, Komoro; Masatoshi Okamura, Saku, all of Japan

[73] Assignee: TDK Corporation, Tokyo, Japan

[21] Appl. No.: 213,932

[22] Filed: Jun. 30, 1988

[30] Foreign Application Priority Data

Jul. 9, 1987 [JP] Japan .............. 62-105720[U]

[51] Int. Cl.$^4$ .............................................. G11B 15/32
[52] U.S. Cl. ...................................... 242/199; 242/198
[58] Field of Search ............... 242/198, 199; 360/132

[56] References Cited

U.S. PATENT DOCUMENTS 4,382,565 5/1983 Shiba ................................. 242/199
4,463,918 8/1984 Takagi .......................... 360/132 X
4,569,492 2/1986 Gelardi et al. ..................... 242/199
4,706,148 11/1987 Komiyama et al. ............. 242/198 X Primary Examiner—David Werner
Assistant Examiner—Phillip Han
Attorney, Agent, or Firm—Oblon, Spivak, McClelland, Maier & Neustadt

[57] ABSTRACT

A magnetic tape cassette comprises a casing consisting of upper and lower half casings, reel hubs contained in the casing so as to be rotatable, a magnetic tape wound around on the reel hubs, guide rollers and/or guide poles provided in the casing, a pad for pushing the magnetic tape against the guide rollers and/or guide poles, and a pad position restricting member formed integrally with the upper and lower half casings to restrict the position of the pad.

7 Claims, 4 Drawing Sheets

MAGNETIC TAPE CASSETTE

BACKGROUND OF THE INVENTION

1. Field of the Invention

The present invention relates to a magnetic tape cassette used for an audio or a video tape recorder, which has a pad for pushing a magnetic tape against guide rollers or guide poles.

2. Discussion of Background

There has been known a magnetic tape cassette of a type that a magnetic tape is wound around reel hubs rotatably supported in the casing. When data recorded in the magnetic tape are to be reproduced, the magnetic tape rewound at a supplying side reel hub runs toward a winding side reel hub while it is guided by guide rollers and/or guide poles arranged in a running path of the magnetic tape. When the magnetic tape is rewound at a winding side reel hub, it is driven in the opposite direction. In this case, the guide poles simply determine the passage of the magnetic tape, and the guide rollers supported in a freely rotatable manner function not only to determine the running path but also to make the running of the magnetic tape smooth. A pad is provided in the casing to push the magnetic tape against the guide rollers and/or the guide poles to remove a loosing state in the magnetic tape when it is driven in the magnetic tape cassette.

The pad 12 is constituted by an elongated thin member disposed near a rotating region of the winding side reel hub 10 as shown in FIG. 7. The pad 12 has a fitting part 18 with an aperture at its one end in which a supporting member 16 projects from a casing 14 to support the pad. The pad 12 has a pressing part 20 at the other end and an elongated arm 22 at the intermediate portion. In FIG. 7, reference numerals 24 and 26 designate guide rollers having a small diameter, a numeral 28 designates a guide roller having a large diameter, a numeral 30 designates the above-mentioned magnetic tape and a numeral 32 designates a front face to close a front opening 34 in the casing 14.

However, in the conventional magnetic tape cassette, when the pad 12 is elastically deformed by a friction caused by the magnetic tape when the tape is driven, the arm 22 of the pad 12 may be bent to come into the rotating region of the reel hub 10. When the contact of the pad 12 to the reel hub 10 takes place, the rotation of the reel hub 10 is hindered resulting in performance problems. Further, there arise problems such that the pad 12 is damaged reducing its pressing force and scraped powder is deposited on the magnetic tape 30 to cause a drop-out phenomenon.

SUMMARY OF THE INVENTION

It is an object of the present invention to provide a magnetic tape cassette which assures a stable operation by avoiding the contact of a pad to a reel hub.

The foregoing and the other objects of the present invention have been attained by providing a magnetic tape cassette which comprises a casing consisting of upper and lower half casings, reel hubs contained in the casing so as to be rotatable, a magnetic tape wound around on the reel hubs, guide rollers and/or guide poles provided in the casing, a pad for pushing the magnetic tape against the guide rollers and/or guide poles, and a pad position restricting member formed integrally with the upper and lower half casings to restrict the position of the pad.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
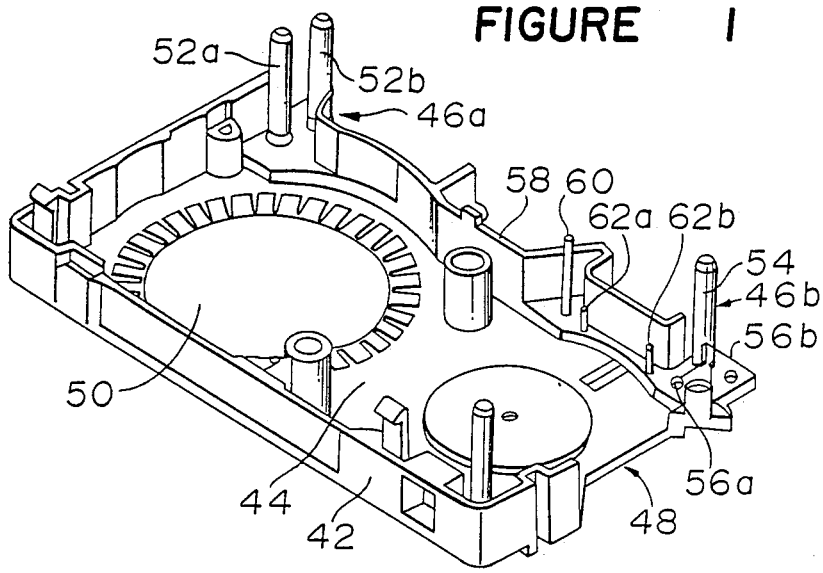
FIG. 1 is a perspective view of an embodiment of the lower half casing used for a VHS-C type magnetic tape cassette according to the present invention.
Figure 2:
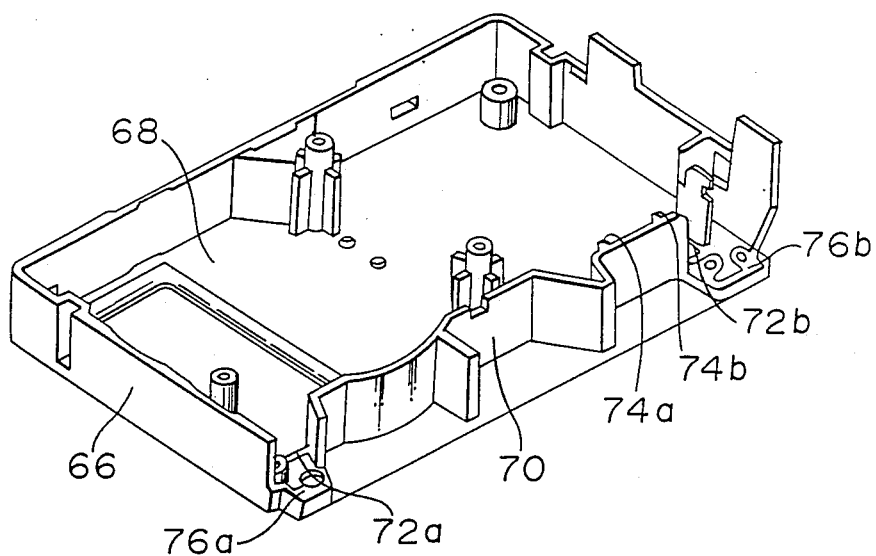
FIG. 2 is a perspective view of an embodiment of an upper half casing used for such magnetic tape cassette of the present invention.

An embodiment of the magnetic tape cassette according to the present invention will be described with reference to FIGS. 1 to 4, wherein FIG. 1 is a perspective view showing the inner structure of a lower half casing in a VHS-C type magnetic tape cassette and FIG. 2 is a perspective view showing the inner structure of an upper half casing for the magnetic tape cassette.

The lower half casing 40 is provided with a rectangular bottom face plate 44 and a circumferential wall 42 extending vertically from the circumference of the bottom face plate 44 at a substantially constant height. The circumferential wall 42 is not in a continuous form but is provided with openings 46a, 46b to lead in and out the magnetic tape and an opening 48 through which a part of the winding side reel hub projects. A hub-driving shaft insertion opening 50 is formed in the bottom face plate 44. Two guide roller pins 52a, 52b having a large diameter are formed in a parallel relation near the opening 46a which is formed in the lower half casing 40 at the side of feeding the magnetic tape, whereby the magnetic tape is held between guide rollers mounted on the guide roller pins. On the other hand, a single guide roller pin 54 having a large diameter and two seat portions 56a, 56b at which guide roller pins having a small diameter are set up are formed near the opening 46b which is formed in the lower cassette casing at the side of winding the magnetic tape. The guide roller pin 54 and the two seat portions 56a, 56b are in such positional relation as to form an isosceles triangle, whereby guide rollers mounted on the guide roller pin 54 and guide roller pins set up at the seat portions 56a, 56b hold the magnetic tape which runs in and between the guide rollers.

This arrangement is adopted in view of the drawback of the conventional magnetic tape cassette resulting from an inferior cylindricity of the guide rollers which may deform the magnetic tape. Such a problem exists because metal pins having the same diameter are used as supporting pins for supporting guide rollers irrespective of the diameter of the guide rollers even when the diameter of the guide rollers is different from each other; this causes an increase in the wall thickness of the guide roller when it has a large diameter, whereby a recess is formed in the outer circumferential surface of the guide roller due to shrinkage when the guide roller is molded.

In the present invention, the supporting pin for the guide roller having a large diameter is formed integrally with the lower half casing and the wall thickness of the guide roller to be mounted on the supporting pin is determined to have the optimum dimension whereby the guide roller having good cylindricity is obtainable to thereby eliminate a drop-out or deformation of the magnetic tape, and to improve characteristics such as output level variation. Further, the number of parts is reduced by forming the supporting pin integrally with the cassette casing to thereby improve the quality of the cassette casing and to reduce manufacturing cost. Guide poles may be used for the guide rollers having a small diameter.

A first pad is provided near the opening 46a and inside the front wall 58 to force the magnetic tape against the guide rollers 52a, 52b by its pressing part. The second pad is provided near the opening 46b and inside the front wall 58 to force the magnetic tape against the guide rollers supported by the guide roller pins. The first pad placed at the magnetic tape feeding opening has a smaller length and one end of the pad is attached at the rear side of the front wall 58 because a space for the first pad is limited in the casing. On the other hand, the second pad disposed at the magnetic tape winding side opening is in an elongated form to increase elasticity, and one end of the second pad is supported by a pad supporting pin 60 which vertically extends from the bottom face plate 44 at a position apart from the magnetic tape winding side opening 46b and the other end of the pad extends along the rear side of the front wall 58. Since the second pad is arranged near a rotating region of the winding side reel hub, the magnetic tape cassette of the present invention is provided with a pad position restricting member, e.g. two pad position restricting pins 62a, 62b in an area between the rotating region of the reel hub and the second pad. The pad position restricting pins 62a, 62b vertically project from the bottom face plate 44.

An upper half casing 64 comprises a rectangular upper face plate 68 and a circumferential wall 66 extending from the outer circumference of the upper face plate 68 with a substantially constant height. The circumferential wall 66 is in a substantially continuous form except that there are two openings 72a, 72b at both sides of the front wall 70 to pass the magnetic tape therethrough. The openings 72a, 72b and the front wall 70 of the upper half casing 64 are respectively correspond in position to openings 46a, 46b and the front wall 58 of the lower half casing 40. Two small ribs 74a, 74b are formed as a pad position restricting member in the front wall 70 of the upper half casing 64 at a position substantially corresponding to that of the two pad position restricting pins 62a, 62b in the lower half casing 40. Seat portions 76a, 76b are formed in the upper face plate 68 in the area of the both openings 72a, 72b to accept the other end of the guide roller pins 52a, 52b, 54 which project from the bottom face plate 44 of the lower half casing 40.

Figure 3:
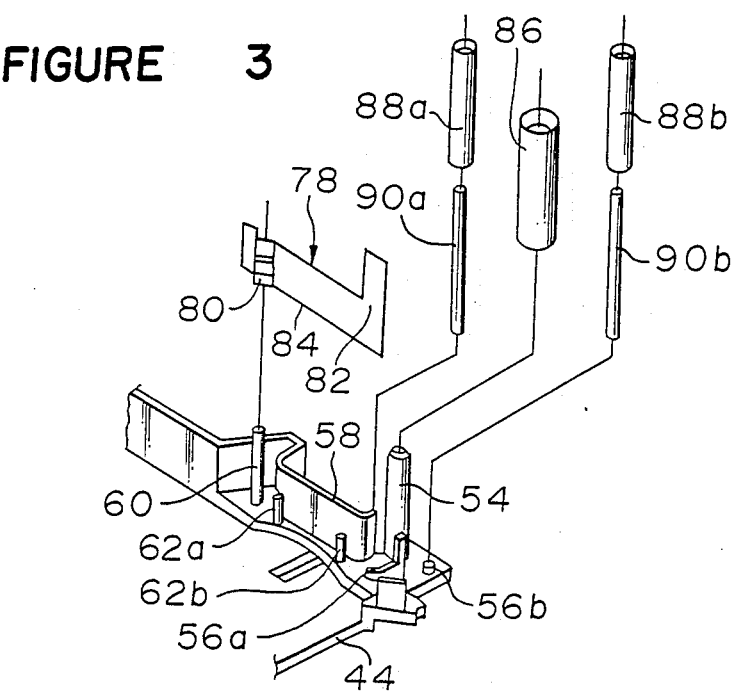
FIG. 3 is a perspective view in a disassembled state of a portion of or near an opening at a magnetic tape winding side of the magnetic tape cassette shown in FIG. 1.
Figure 4:
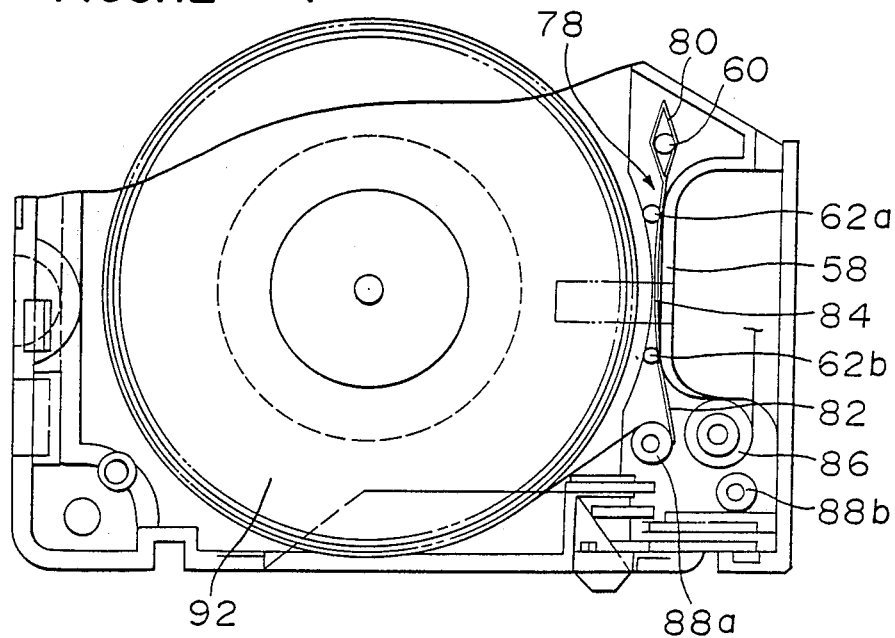
FIG. 4 is a front view showing a magnetic tape cassette in an assembled state but removing an upper face plate of the magnetic type cassette of the present invention.
Figure 7:
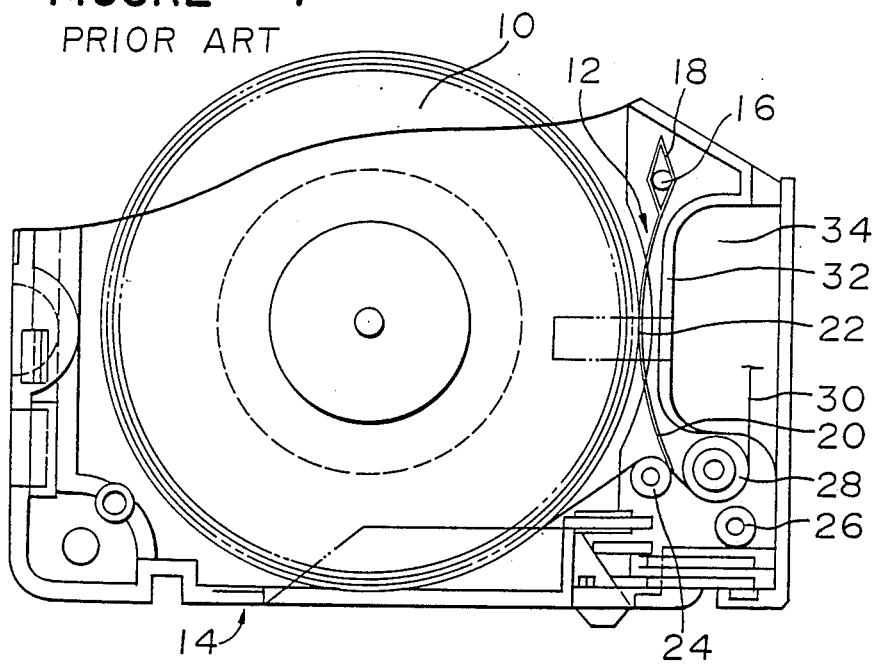
FIG. 7 is a front view of a part corresponding to FIG. 4 in a conventional VHS-C type magnetic tape cassette.

FIG. 3 is a perspective view showing the magnetic tape winding side opening in a disassembled plate and FIG. 4 is a front view of the magnetic tape cassette in an assembled state but removing the upper face plate. In FIGS. 3 and 4, a reference numeral 78 designates an elongated sheet-like pad made of a plastic material which comprises a fitting part 80 with an aperture in which the pad supporting pin 60 is inserted, a pressing part 82 at the other end and an intermediate arm portion 84. The pad 78 is fixed to the pad supporting pin 60 and extends between the rear side of the front wall 58 and the two pad position restricting pins 62a, 62b. A guide roller 86 is fitted around the guide roller pin 54 having a large diameter, and guide rollers 88a, 88b are respectively fitted around the guide roller pins 90a, 90b having a small diameter which are set up at seat portions 56a, 56b. When these elements are assembled together, the position of the pad 78 is restricted by the position restricting pins 62a, 62b and the position restricting ribs 74a, 74b, whereby the magnetic tape does not come off a restricting area even when there occurs elastic deformation in the pad 78 when it is in use. Namely, the pad 78 undergoes restriction in the forward and backward directions by the position restricting pins 62a, 62b disposed between the pad 78 and the rotating region of the magnetic tape winding side reel hub 92, and undergoes restriction in the vertical direction by the position restricting ribs 74a, 74b formed on the rear side of the front wall 70 of the upper half casing 64 so that contact of the pad to the magnetic tape winding side reel hub 92 is avoided. The position restricting pins 62a, 62b and ribs 74a, 74b may be formed integrally with the upper and lower half casings 40, 64, so that they can sufficiently resist a force of elastic deformation by pad 78 which tends to project toward the magnetic tape winding side reel hub 92. Accordingly, the interference between the pad 78 and the reel hub 92 can be eliminated, whereby the pad is seldom damaged and a smooth rotation of reel hub 92 is obtainable.

Figure 5:
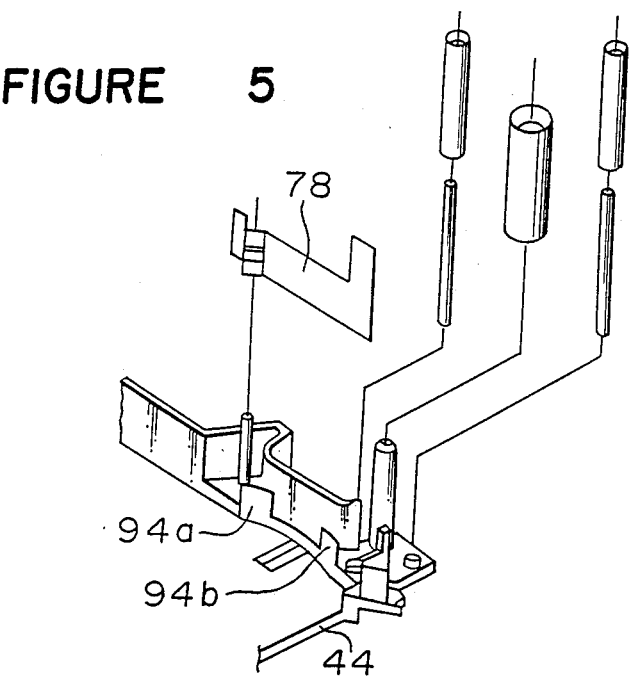
FIG. 5 is a perspective view in a disassembled state of another embodiment of a portion corresponding to FIG. 3 of the magnetic tape cassette according to the present invention.

FIG. 5 is a perspective view showing another embodiment of a position restricting member which corresponds to that in FIG. 3. In FIG. 5, reference numerals 94a, 94b respectively designate position restricting pieces in a form of rectangular rib which are disposed between the pad 78 and a rotating region of the magnetic tape winding side reel hub and extend from the bottom face plate 44. The rectangular ribs 94a, 94b provide further greater restricting function to the pad 78 even though the height and the position of the rectangular ribs are the same as the position restricting pins 62a, 62b. The structure, the size, the position and the number of the position restricting member may be changed according to the conditions required for the magnetic tape cassette.

Figure 6:
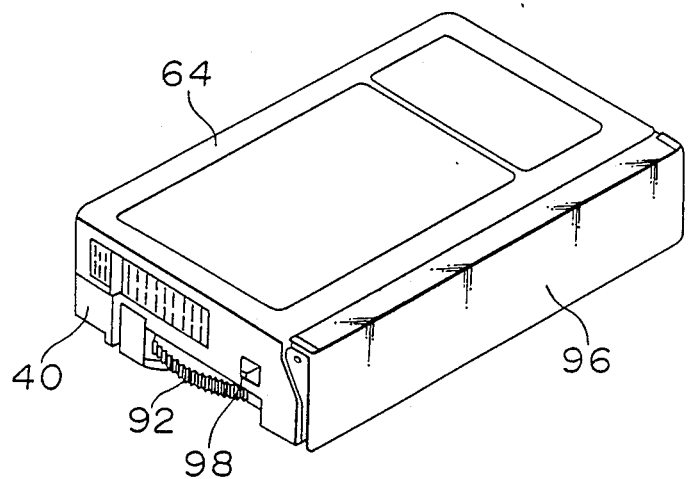
FIG. 6 is a perspective view of a VHS-C type magnetic tape cassette in which the present invention is applied.

FIG. 6 shows the outer appearance of an assembled magnetic tape cassette of the present invention. A reference numeral 96 designates a front cover capable of covering the front face of the assembled upper and lower half casings 40, 64 in which the magnetic tape wound around the reel hubs is received. The front cover 96 closes the front face in a locking condition when the magnetic tape cassette is not used. When the magnetic tape cassette is mounted on a deck to use it, an operating lever 98 is pushed to unlock the front cover 96 bringing the front cover 96 into a opening state; thus the magnetic tape is exposed at the front opening of the cassette to allow a loading operation.

Thus, in accordance with the magnetic tape cassette of the present invention, the pad position restricting members are provided to restrict the movement of the pad, whereby the interference between the pad and the reel hub can be avoided to minimize a fault in running operations of the magnetic tape and to prevent a dropout.

Obviously, numerous modifications and variations of the present invention are possible in light of the above teachings. It is therefore to be understood that within the scope of the appended claims, the invention may be practiced otherwise than as specifically described herein.

What is claimed is:

1. A magnetic tape cassette having a lower half casing and an upper half casing and housing a magnetic tape, said magnetic tape cassette comprising:
   a rotatable reel hub means for winding said magnetic tape, said hub means being connected to said lower half casing;
   a pad having a fitting part, an intermediate arm, and a pressing part;
   a pad supporting pin connected to said lower half casing, said fitting part of said pad being fixed to said pad supporting pin;
   a guide roller rotated around a guide roller pin connected to said lower half casing;
   a pair of pad position restricting pins separated by a distance corresponding to the length of said intermediate arm of said pad, said restricting pins being integrally connected to said lower half casing; and
   said pressing part of said pad making contact with said magnetic tape so that said magnetic tape is in pressure contact with said guide roller.

2. A magnetic cassette according to claim 1, wherein: said fitting part of said pad is provided with an aperture for inserting over said pad supporting pin.

3. A magnetic cassette according to claim 1, further comprising:
   a pair of position restricting ribs integrally connected to a front wall of said upper half casing.

4. A magnetic cassette according to claim 3, further comprising:
   connected means for connecting said lower half casing and said upper half casing.

5. A magnetic cassette according to claim 4, wherein: said pair of position restricting ribs are located above said intermediate arm of said pad to prevent a vertical movement of said pad.

6. A magnetic cassette according to claim 5, wherein: said pair of restricting ribs are formed on the rear side of said front wall of said upper half casing such that said ribs are located between said pad and an upper face plate of said upper half casing.

7. A magnetic cassette according to claim 5, wherein: said pair of pad positioning restricting pins are located at the rear side of said lower half casing such that said pair of pins are between said pad and a rotating region of said rotatable reel hub means.

* * * * *